E. A. McINTOSH.
HOSE COUPLING.
APPLICATION FILED FEB. 21, 1913.
1,095,220.
Patented May 5, 1914.
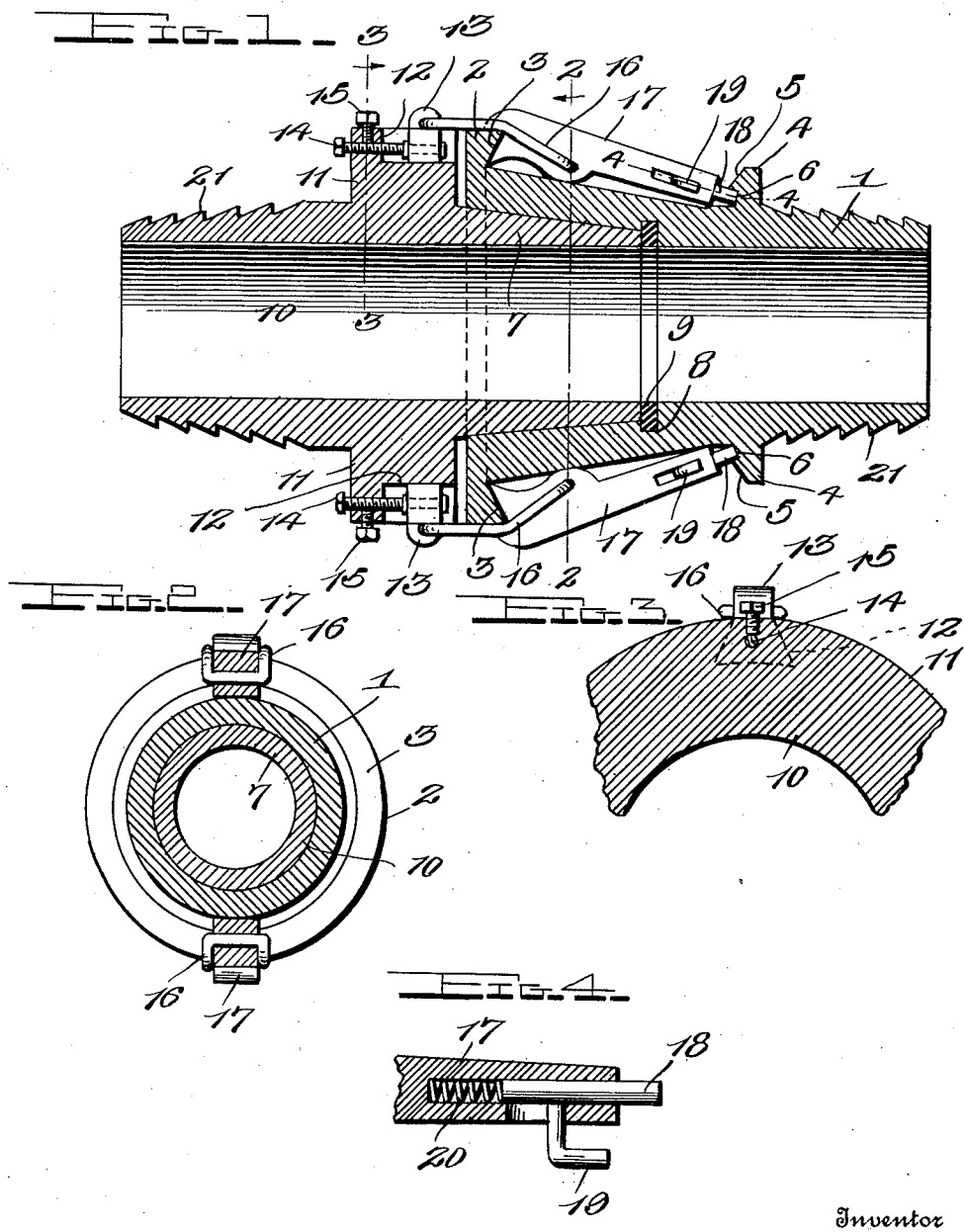
Witnesses
Chas. L. Griesbauer.
Frank B. Hoffman.
Inventor
E. A. McIntosh,
By Watson E. Coleman,
Attorney

UNITED STATES PATENT OFFICE.

ERNEST A. McINTOSH, OF RANDOLPH, VERMONT.

HOSE-COUPLING.

1,095,220.   Specification of Letters Patent.   Patented May 5, 1914.

Application filed February 21, 1913. Serial No. 749,980.

*To all whom it may concern:*

Be it known that I, ERNEST A. MCINTOSH, a citizen of the United States, residing at Randolph, in the county of Orange and State of Vermont, have invented certain new and useful Improvements in Hose-Couplings, of which the following is a specification, reference being had to the accompanying drawings.

This invention relates to couplings and more particularly to hose couplings.

The principal object of the invention is the provision of a hose coupling embodying male and female coupling members which can be readily and effectively coupled together by inserting the male member within the female member and clamping the two members in coupled position by locking levers carried by one of the sections and adapted to lockingly engage the opposite section.

Another object of the invention is the provision of a hose coupling of the above stated character wherein the locking mechanism for locking said coupling members together may be adjusted to take up the wear and tear between the members so as to provide a tight and efficient coupling at all times.

A further object of the invention is the provision of a hose coupling embodying male and female members, the male member carrying locking levers adapted to lockingly engage at one of their ends with a collar formed on the inner end of the female member and provided with locking means on the opposite ends thereof adapted to lockingly engage with a collar formed on the opposite end of the female member, whereby the locking levers will be positively held in locking position against accidental unlocking.

A still further object of the invention is the provision of a hose coupling of the above stated character which will be cheap and inexpensive to manufacture and of durable and substantial design.

With these and other objects in view as will appear as the description proceeds, the invention comprises the various novel features of construction, combination and arrangement of parts as will be more fully described hereinafter and set forth in particularity in the appended claims.

Referring to the drawings, Figure 1 is a longitudinal sectional view through my improved hose coupling. Fig. 2 is a vertical transverse sectional view taken on the line 2—2, Fig. 1, looking in the direction of the arrow. Fig. 3 is a transverse section taken on the line 3—3, Fig. 1; and Fig. 4 is a horizontal sectional view taken on the line 4—4, Fig. 1.

Similar characters of reference are used to denote like parts throughout the accompanying drawings and the annexed specification.

Referring more particularly to the drawings, the reference numeral 1 indicates the female coupling member which is provided at its inner end with a collar 2, the latter being beveled or inclined inwardly as shown at 3. The female member 1 has provided thereon, at a point adjacent its outer end, a collar 4, which is beveled inwardly as shown at 5 and is under-cut to provide a circular locking shoulder 6 disposed slightly above the body portion of the coupling member. The body portion of the coupling member is tapered from its inner end toward its outer end between said collars for a purpose that will presently appear. The inner end of the female coupling member is provided with an inwardly tapering bore 7 which extends into communication with an annular groove 8, a rubber washer or other suitable gasket 9 being disposed within the annular groove.

The male coupling member 10 is provided intermediate its ends with a collar 11, the forward end of the male member tapering and adapted to seat within the tapered bore 7 of the female coupling member. As shown, the tapered end of the male member is slightly larger than the tapered bore 7 so that the male member may be forced inwardly of the female member into frictional engagement therewith and with the gasket 9 to form a water tight joint. It is also to be noted that the length of the tapered end of the male member is slightly longer than that of the tapered bore so as to allow the respective parts to be adjusted to take up the ordinary wear and tear between the parts. The collar 11 is provided in its outer peripheral face at diametrically opposite points with longitudinally disposed dovetail slots or grooves 12 which extend outwardly from the inner face of the collar 11 to a point adjacent its outer face. Movable blocks 13 are disposed within these grooves 12 and have connected to their lower dovetail ends horizontally disposed adjusting screws 14, which extend through the outer face of the collar 11 and are swivelly connected to the blocks 13, whereby the latter may be moved longitudinally of the grooves upon the adjusting of the screws 14.

Set screws 15 extend in through the peripheral face of the collar 11 into engagement with the screws 14, whereby the blocks 13 may be held in any desired adjusted position. These blocks 13 are provided in their outer ends with transverse openings which receive the terminal ends of a pair of spring arms 16, the opposite ends of the arms being pivotally connected to the medial portion of a pair of locking levers 17. These arms 16 are slightly bowed outwardly intermediate their ends, as clearly shown in Fig. 1 of the drawings, so as to enable the locking levers to be moved inwardly into a locking position. The inner ends of these locking levers 17 are notched and are adapted to engage and overlie the outer peripheral edge of the collar 2, a portion of the locking levers resting upon the peripheral face of the collar 2 and the other portion of the levers lockingly engaging the inwardly beveled wall of the collar 2. The outer ends of these levers 17 are provided with longitudinally spring-actuated locking bolts 18 which are adapted to engage beneath the circular flange 6 of the collar 4 formed upon the female member 1. These locking bolts 18 are provided with laterally extending angularly shaped arms 19 which project through a slot in the side of the levers. Expansible springs 20 are disposed beyond the longitudinally movable bolts 18 and adapted to normally exert an outward tension upon the bolts to maintain the latter in locking engagement beneath the shoulder 6.

In the operation of the device, the male member is inserted within the female member, after which the notched ends of the locking levers are placed upon the outer peripheral edge of the collar 2 and are then forced inwardly against the body of the female coupling member so that the pivot of the spring arms 16 are moved inwardly out of alinement with the outer periphery of the collar 2 and the pivotal connection of the arms 16 with the blocks 13. While this serves as a very effective locking means for locking the coupling members together, the spring actuated locking bolts upon the opposite ends of the locking levers will serve as an additional locking means to effectively lock the ends of the levers to hold the latter in locked position against accidental unlocking. It will be noted that since the collar 4 is provided with the beveled face 5, the ends of the locking bolts 18 will ride inwardly over this inclined face and spring outwardly beneath the locking flange 6 when the levers are moved to a locking position. The outer ends of the male and female members are serrated or corrugated as shown at 21 for the reception of suitable hose sections.

From the foregoing description taken in connection with the accompanying drawings, the advantages of construction and the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made, when desired, as are within the scope of the appended claims.

Having thus described this invention, what is claimed is:—

1. A hose coupling comprising male and female members, the female member having formed thereon a collar at its inner end and a collar at its outer end, the male member being provided medially with a collar and formed at diametrically opposite points with longitudinally extending grooves, blocks slidably mounted in said grooves, adjusting screws threaded through the outer wall of the collar and swivelly connected to said blocks, spring arms pivotally connected to said arms and locking levers connected intermediate their ends to the opposite ends of said arms, the inner ends of said lever being adapted to lockingly engage behind the inner collar of the female member.

2. A hose coupling comprising male and female members, the female member being provided with collars at its inner ends, the outer portion of the female member being tapered from the inner collar toward the outer collar, the male member being provided medially with a collar and formed at diametrically opposite points with longitudinally extending dove-tail grooves, blocks slidably mounted in said grooves, adjusting screws threaded through the outer wall of said collar and swivelly connected to said blocks, set screws threaded through the peripheral face of said collar into engagement with said adjusting screws, a pair of spring arms pivotally connected to said blocks, locking levers pivoted intermediate their ends to the opposite ends of said arms, the inner ends of said levers being adapted to lockingly engage the inner collar of the female member.

In testimony whereof I hereunto affix my signature in the presence of two witnesses.

ERNEST A. McINTOSH.

Witnesses:
A. M. HUBBARD,
EUGENE F. BRIGGS.

---

Copies of this patent may be obtained for five cents each, by addressing the "Commissioner of Patents Washington, D. C."